United States Patent [19]

Eckstein et al.

[11] Patent Number: 5,094,688
[45] Date of Patent: Mar. 10, 1992

[54] TRIARYLMETHANE COLOR-FORMING AGENTS

[75] Inventors: Udo Eckstein, Cologne; Hubertus Psaar, Leverkusen; Gert Jabs, Odenthal, all of Fed. Rep. of Germany

[73] Assignee: Bayer Aktiengesellschaft, Leverkusen, Fed. Rep. of Germany

[21] Appl. No.: 231,796

[22] Filed: Aug. 12, 1988

[30] Foreign Application Priority Data

Aug. 21, 1987 [DE] Fed. Rep. of Germany ....... 3727878

[51] Int. Cl.$^5$ .............. C09D 11/00; B41M 5/124; C07D 209/82
[52] U.S. Cl. .................. 106/21; 503/223; 503/224; 546/153; 546/165; 548/444
[58] Field of Search .............. 106/14.5, 19, 21; 503/223, 224; 546/153, 165; 548/444

[56] References Cited

U.S. PATENT DOCUMENTS

| | | | |
|---|---|---|---|
| 3,752,825 | 8/1973 | Raue et al. | 548/440 |
| 4,154,463 | 5/1979 | Burri | 106/21 |
| 4,211,436 | 7/1980 | Kuhlthou et al. | 106/21 |
| 4,254,032 | 3/1981 | Petitpierre et al. | 503/224 |
| 4,275,005 | 6/1981 | Petitpiette et al. | 548/444 |
| 4,339,275 | 7/1982 | Tutty | 106/21 |
| 4,355,823 | 10/1982 | Burri | 106/21 |
| 4,362,565 | 12/1982 | Pineaer et al. | 106/21 |
| 4,369,326 | 1/1983 | Petitpierre et al. | 548/444 |
| 4,737,587 | 4/1988 | Okumura et al. | 503/224 |
| 4,783,196 | 11/1988 | Eckstein et al. | 106/19 |
| 4,859,650 | 8/1989 | Hilterhaus et al. | 503/224 |
| 4,923,641 | 5/1990 | Eckstein et al. | 106/19 |

FOREIGN PATENT DOCUMENTS 2369098 5/1978 France.

OTHER PUBLICATIONS

Chemical Abstracts, vol. 107, No. 22, Nov. 1987, p. 106, Paragraph No. 200398a, Columbus, Ohio, US: & JP-A-62 127 353 (Mitsubishi Paper Mills, Ltd.) 09-06-1987.
Chemical Abstracts, vol. 108, No. 14, Apr. 1988, p. 92, Paragraph No. 114213a, Columbus, Ohio, US: & JP-A-62 129 357 (Mitsubishi Paper Mills, Ltd) 11-06-1987.

*Primary Examiner*—Mark L. Bell
*Assistant Examiner*—Helene Klemanski
*Attorney, Agent, or Firm*—Sprung Horn Kramer & Woods

[57] ABSTRACT

Color-forming agents of the present formula

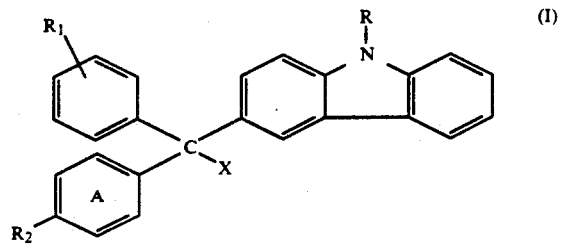

wherein
X denotes hydroxyl, alkoxy, alkenyloxy, aralkoxy, cycloalkoxy, aryloxy, acyloxy, alkylamino, dialkylamino, acylamino, aralkylamino or arylamino,
R denotes alkyl, alkenyl or aralkyl,
$R_1$ denotes hydrogen, halogen or alkyl,
$R_2$ denotes alkoxy, aralkoxy, aryloxy or a radical of the formula

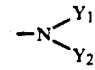

$Y_1$ and $Y_2$ independently of one another denote alkyl, aryl, cycloalkyl or aralkyl or $R_2$, with A in the o-position, forms a heterocyclic ring,
a benzene ring can be fused onto the ring A, in the o-/m-position relative to $R_2$, and the ring A and its fused-on rings and the cyclic and acyclic radicals can carry further non-ionic substitutents customary in dyestuffs chemistry, are used in thermoreactive papers and pressure-sensitive recording materials and for the preparation of highly concentrated solutions in organic solvents.

9 Claims, No Drawings

TRIARYLMETHANE COLOR-FORMING AGENTS

The invention relates to colour-forming agents of the general formula

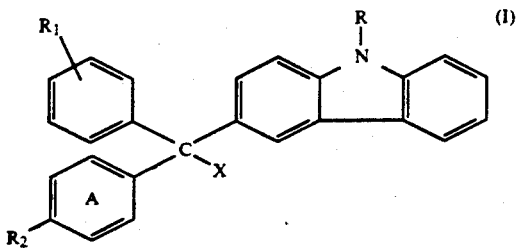

wherein
X denotes hydroxyl, alkoxy, alkenyloxy, aralkoxy, cycloalkoxy, aryloxy, acyloxy, alkylamino, dialkylamino, alkylamino, acylamino, aralkylamino or arylamino,
R denotes alkyl, alkenyl or aralkyl,
R₁ denotes hydrogen, halogen or alkyl,
R₂ denotes alkoxy, aralkoxy, aryloxy or a radical of the formula

Y₁ and Y₂ independently of one another denote alkyl, aryl, cycloalkyl or aralkyl or R₂, with A in the o-position, forms a heterocyclic ring,
a benzene ring can be fused onto the ring A, in the o-/m-position relative to R₂, and the ring A and its fused-on rings and the cyclic and acyclic radicals can carry further non-ionic substituents customary in dyestuffs chemistry, their preparation, their use in thermoreactive papers and pressure-sensitive recording materials and the preparation of their highly concentrated solutions in organic solvents from the group comprising optionally chlorinated hydrocarbons and phthalic acid esters, and the use of these solutions for the preparation of pressure-sensitive recording materials.

Non-ionic substituents which are customary in dyestuffs chemistry are, for example, halogen, hydroxyl, alkoxy, alkenyloxy, aryloxy, aralkoxy, cycloalkyloxy, aryl, alkylmercapto, arylmercapto, aralkylmercapto, alkylsulphonyl, cyano, carbamoyl, alkoxycarbonyl, amino, which can be substituted by 1 or 2 alkyl, cycloalkyl, aryl or aralkyl groups, preferably to form a 5- or 6-membered ring, or the substituents of which can be cyclized, acylamino, alkenyloxy, alkylcarbonyloxy and arylcarbonyloxy, and furthermore, as substituents of the rings, alkyl, aryl, aralkyl, alkenyl or arylvinyl.

Alkyl stands for C₁–C₃₀-alkyl, in particular C₁–C₁₂-alkyl.

The alkyl radicals and the alkyl radicals in alkoxy, alkylthio, alkylamino, alkanoylamino, alkylsulphonyl and alkoxycarbonyl groups can be branched and can be substituted, for example, by fluorine, chlorine, C₁- to C₄-akoxy, cyano or C₁-C₄-alkoxycarbonyl.

Aralkyl is, in particular, phenyl-C₁- to -C₄-alkyl, which can be substituted in the phenyl nucleus by halogen, C1- to C4-alkyl and/or C1- to C4-alkoxy.

Cycloalkyl is, in particular, cyclopentyl or cyclohexyl which is optionally substituted by methyl.

Alkenyl is, in particular, C₂–C₅-alkenyl, which can be monosubstituted by hydroxyl, C₁- to C₄-alkoxy, cyano, C₁- to C₄-alkoxycarbonyl, chlorine or bromine. Vinyl and allyl are preferred.

Halogen is, in particular, fluorine, chlorine or bromine, preferably chlorine.

Aryl is, in particular, phenyl or naphthyl, optionally substituted by one to three substituents from the group comprising C₁- to C₄-alkyl, chlorine, bromine, cyano, C₁- to C₄-alkoxycarbonyl and C₁- to C₄-alkoxy.

Alkoxy is, in particular, C₁-C₁₂-alkoxy which is optionally substituted by chlorine or C₁-C₄-alkoxy.

Acyl is, in particular, C₁- to C₄-alkylcarbonyl or C₁- to C₄-alkoxycarbonyl, or mono- or di-substituted aminocarbonyl or aminosulphonyl, optionally substituted by C₁-C₄-alkyl, phenyl or benzyl.

Alkoxycarbonyl is, in particular, C₁- to C,-alkoxycarbonyl which is optionally substituted by hydroxyl, halogen or cyano.

The rings can be substituted by non-ionic substituents, in particular by C₁-C₄-alkyl, C₁-C₄-alkoxy, cyano, nitro or halogen.

The colour-forming agents of the formula (I) which are of particular importance are the compounds of the formula

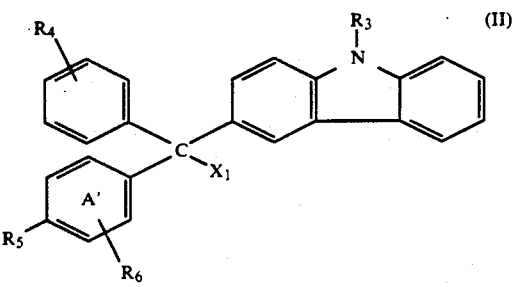

wherein
X₁ denotes hydroxyl, optionally C₁–C₄-alkoxy-substituted C₁–C₁₂-alkoxy or benzyloxy,
R₃ denotes C₁–C₁₂-alkyl or benzyl,
R₄ denotes hydrogen, chlorine or C₁–C₁₂-alkyl,
R₅ denotes C₁–C₁₂-alkoxy, benzyloxy, phenoxy or a radical of the formula

R₆ denotes hydrogen, chlorine, C₁–C₁₂-alkyl, C₁–C₁₂-alkoxy, C₁–C₄-alkylamino or di-C₁–C₁₂-alkylamino,
Y₃ and Y₄ independently of one another denote C₁–C₁₂-alkyl which is optionally substituted by chlorine, cyano, C₁–C₄-alkoxycarbonyl or C₁–C₄-alkoxy, or cyclohexyl, phenyl or benzyl, which can be substituted by chlorine, C₁–C₄-alkyl or C₁–C₄-alkoxy, or
R₅ and R₆ denote members which, together with ring A', are required to complete a ring system of the following formulae

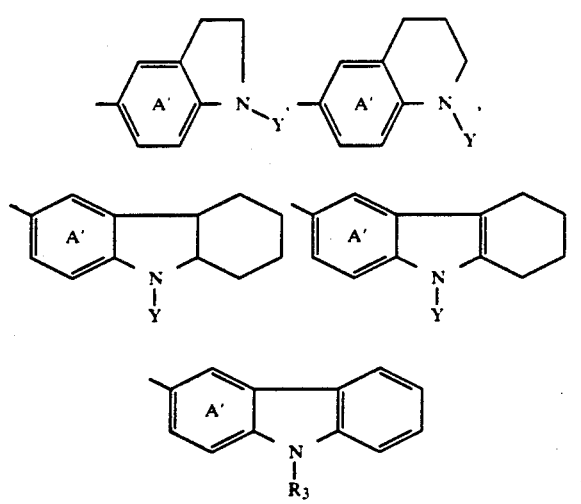

wherein Y stands for $C_1-C_{12}$-alkyl, $Cl-C_2-C_4$-alkyl, $C_1-C_4$-alkoxy-$C_2-C_4$-alkyl, phenyl or benzyl and the saturated ring component can carry up to 4 radicals from the group comprising chlorine, methyl, ethyl, methoxy, ethoxy and phenyl.

Examples of radicals which are substituted in the saturated ring are:

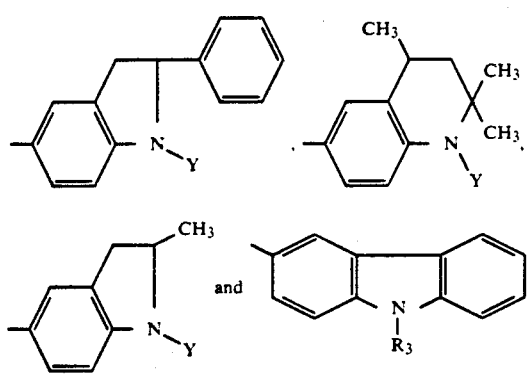

Particularly preferred colour-forming agents are those of the formula

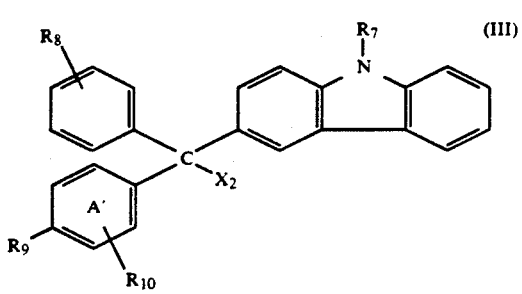

wherein
$X_2$ denotes hydroxyl or $C_1-C_{12}$-alkoxy,
$R_7$ denotes $C_1-C_{12}$-alkyl,
$R_8$ denotes hydrogen, chlorine or $C_1-C_{12}$-alkyl,
$R_9$ denotes $C_1-C_4$-alkoxy, benzyloxy or a radical of the formula

$R_{10}$ denotes hydrogen, methyl, ethyl, propyl, butyl, methoxy, ethoxy, dimethylamino or diethylamino or $R_9$ and $R_{10}$ denote members which, together with the benzene ring to which they are bonded, are required to complete a ring system of the formulae

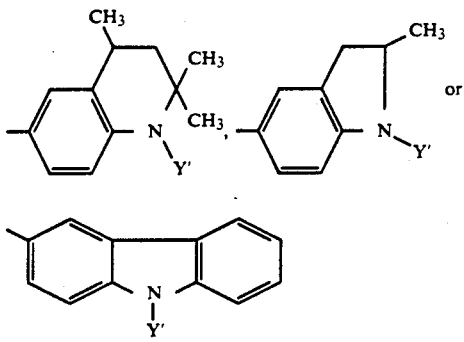

Y' denotes $C_1-C_{12}$-alkyl and
$Y_5$ and $Y_6$ independently of one another denote $C_1-C_{12}$-alkyl, phenyl or benzyl.

Suitable (chloro)hydrocarbons for the solutions according to the invention are high-boiling (150°-400° C.) (chloro)hydrocarbons which are liquid at room temperature, for example paraffins, in particular $C_{10}-C_{20}$-n-paraffins, $C_{10}-C_{20}$-iso-paraffins and $C_{10}-C_{17}$-chloroparaffins with a chlorine content of 15-70% by weight, and their technical grade mixtures, for example kerosine ($C_{10}-C_{16}$-paraffin) or white oils (50-70% paraffins and 30-50% naphthenes), and aromatic hydrocarbons containing alkyl groups with preferably 1-18 carbon atoms, such as alkyl-biphenyl, in particular iso-propylbiphenyl and tert.-butylbiphenyl, dialkyl-biphenyl, in particular di-isopropylbiphenyl and di-tert.-butyl-biphenyl, alkyl- and dialkyl-naphthalene, in particular iso-propyl-naphthalene and di-tert.-butyl-naphthalene, alkylbenzene, in particular dodecylbenzene, hydrogenated and partly hydrogenated terphenyls, in particular cyclohexyldiphenyl, and diarylalkanes, in particular diphenylethane or ethyldiphenylmethane.

Suitable esters of phthalic acid are, for example, those of $C_2-C_{18}$-aliphatic alcohols, in particular dibutyl phthalate.

Preferred highly concentrated solutions contain 10-50% by weight, in particular 10-35% by weight, of colour-forming agents.

The invention also relates to a process for the preparation of the compounds of the formula (I), characterized in that, preferably in a one-pot reaction, ketones of the formula

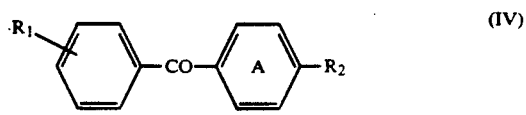

are subjected to a condensation reaction with amines of the formula

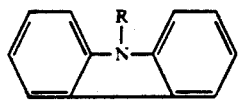

or ketones of the formula

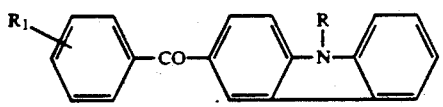

are subjected to a condensation reaction with amines of the formula

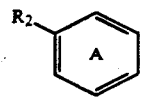

in the presence of a condensing agent which supplies an anion An$^\ominus$, to give the colour salts of the formula

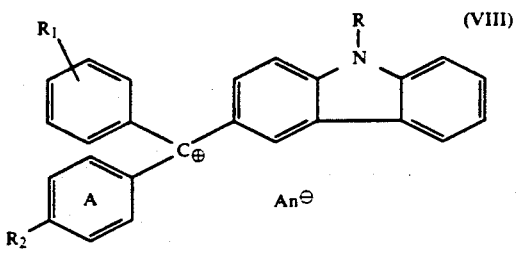

wherein
A, R, R$_1$ and R$_2$ have the abovementioned meaning and An$^\ominus$ denotes an anion from the series comprising
Cl, Br, acetate, sulphate and phosphate, and these salts are reacted without intermediate isolation with bases of the formula $$Me\ X \qquad (IX)$$

wherein
X has the abovementioned meaning and
Me denotes an alkali metal or alkaline earth metal ion, in particular sodium or potassium,
in an organic reaction medium customary for the reactions, a water-insoluble solvent is added and after the reaction, if appropriate after addition of water, the layers formed are separated. After removal of the low-boiling solvent from the organic phase, a) if low-boiling, water-insoluble solvents are used, the colour-forming agents are obtained directly in a very pure form, or b) if low-boiling and high-boiling water-insoluble solvents are used, the ready-to-use highly concentrated solutions are obtained directly.

Phosphorus oxychloride and/or diphosphorus pentoxide are preferably used here as the condensing agents.

Suitable reaction media are polar solvents, such as dimethylformamide, dimethyl sulphoxide, hexamethylphosphoric acid triamide and alkanols. Dimethylformamide and C$_1$–C$_{18}$-alkanols are preferred.

Suitable reaction temperatures are between 20° and 120° C., and 30°–80° C. is preferred.

Suitable low-boiling (40°–145° C.) water-insoluble solvents are hydrocarbons, such as methylene chloride, chloroform, carbon tetrachloride, 1,2-dichloroethane, benzene, toluene, xylene and chlorobenzene.

The triarylmethane colour-forming agents of the formula (I) are usually colourless or at most slightly coloured.

It has been found that the colour-forming agents of the formula (I) are surprisingly readily soluble in the water-insoluble organic solvents mentioned. Solutions with a colour-forming agent content of up to 50% by weight can be obtained.

The colour-forming agent solutions obtained can be marketed and used in pressure-sensitive recording materials, in particular in microencapsulated materials, without further purification.

They have an excellent stability, even under variations in temperature.

For use in the recording materials, they are diluted to concentrations of about 3–10% by weight with the solvents of the solutions according to the invention.

On contact with an acid developer, that is to say an electron acceptor, the compounds according to the invention and their solutions give intense blue, green-blue, green, violet or red colour shades which are excellently fast to sublimation and light. Navy blue, grey or black dyeings can be achieved by mixtures with one another.

They are also useful when mixed with one or more other known colour-forming agents, for example 3,3-bis-(aminophenyl)-phthalides, 3,3-bis-(indolyl)-phthalides, 3-amino-fluoranes, 2,6-diamino-fluoranes, leucoauramines, spiropyrans, spirodipyrans, chromenoindoles, phenoxazines, phenothiazines, carbazolylmethanes or other triarylmethane leuco-dyestuffs, to give green, violet, blue, navy blue, grey or black dyeings.

They exhibit a good colour intensity, high fastness to light and excellent stability to ageing and CB, both on phenotic bases and on activated clays. They are suitable for pressure-sensitive recording material, which can be either copying or registering material. Their rate of development varies according to the substituents. However, they are in general distinguished by a high rate of development, coupled with a simultaneously reduced sensitivity of the recording materials towards unintentional premature development.

A pressure-sensitive material consists, for example, of at least 1 pair of sheets which contain at least one colour-forming agent of the formula (I), dissolved or dispersed in a non-volatile organic solvent and an acid developer.

Such processes and formulations are known, for example, from U.S. Pat. Nos. 2,800,457, 2,800,458, 2,948,753, 3,096,189 and 3,193,404 and from German Offenlegungsschriften 2,555,080 and 2,700,937.

In order to prevent premature activation of the colour-forming agents present in the pressure-sensitive recording material, these agents are preferably enclosed in microcapsules, which as a rule can be crushed by pressure.

Suitable capsule wall materials are, for example, gelatine/gum arabic, polyamides, polyurethanes, polysulphonamides, polyesters, polycarbonates, polysulphonates, polyacrylates and phenol-, melamine- or urea-formaldehyde condensates, such as are described, for example, in M. Gutcho, Capsule Technology and Microencapsulation, Noyes Data Corporation 1972, G.

Baxter, Microencapsulation, Processes and Applications, publisher J. E. Vandegaar and German Offenlegungsschriften (German Published Specifications) 2,237,545 and 2,119,933.

Microcapsules with shells which consist of poly-addition products of poly-isocyanates and polyamines are preferably used in the process according to the invention.

Isocyanates to be used for the preparation of such microcapsules are diisocyanates, polyisocyanates, diisocyanates with a biuret structure, polyisocyanates modified by di- or trifunctional alcohols or other modified isocyanates, for example those of the formula

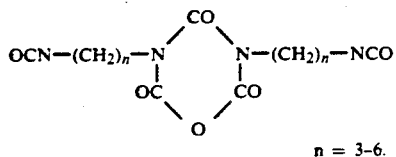

$n = 3-6$.

Diamines which are suitable for reaction with the isocyanates mentioned are aliphatic primary or secondary di- and polyamines.

Isocyanates, amines, solvents and a suitable preparation process for such microcapsules are described, for example, in DE-OS (German Published Specification) 3,203,059.

Thermoreactive recording systems include, for example, heat-sensitive recording and copying materials and papers.

Such a material is described, for example, in German Offenlegungsschrift (German Published Specification) 2,555,080.

Suitable developers are the same electron acceptors such as are used in pressure-sensitive papers, preferably phenolic compounds, which are described, for example, in German Patent Specification 1,251,348, and boric acid and organic, preferably aliphatic dicarboxylic acids.

Another suitable thermoreactive development system, in which acid-modified polymers, preferably of acrylonitrile, act as developers, is described in DE-OS (German Published Specification) 3,337,296.

EXAMPLE 1

37.4 g (0.13 mol) of 4-(N-methyl-N-phenylamino)-benzophenone and 25.6 g (0.13 mol) of 9-ethyl-carbazole are suspended in 96.6 g (0.63 mol) of phosphorus oxychloride, and 30 g of phosphorus pentoxide are added at room temperature. The reaction mixture is stirred at 60° C. for 18 hours and, after cooling to 10° to 15° C., is stirred into 500 ml of methanol so that the temperature does not rise above 40° C. 300 ml of toluene are added and 550 g of 30% strength sodium methylate solution are added dropwise to the dyestuff solution in the course of one hour. The mixture is stirred at 40° C. for 2 hours and then poured onto 500 ml of water. The organic phase is separated off and the solvent is removed under a waterpump vacuum. 200 ml of methanol are added to the residue and the mixture is stirred for a short time. Filtration and drying in vacuo at 30° C. gives 54.5 g (84.4% of theory) of a pale beige crystalline powder of melting point: 75°-78° C. and of the formula

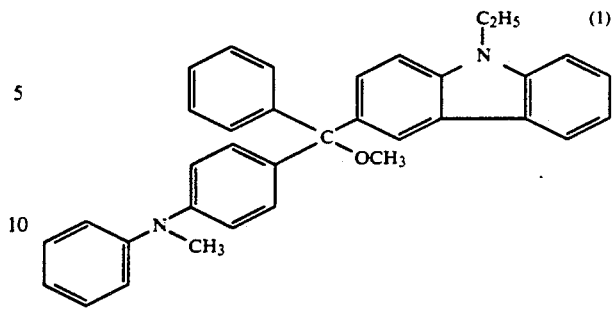

A solution in glacial acetic acid becomes green with $\lambda_{max}=610$ nm and $\lambda_2 =428$ nm.

EXAMPLE 2

42.6 g (0.13 mol) of 4-(N-methyl-N-phenylamino)-benzophenone, 87.7% strength, are added in portions to a suspension of 96.6 (0.63 mol) of phosphorus oxychloride and 28.8 (0.2 mol) of phosphorus pentoxide, 98.5% strength, whereupon the temperature rises to 30°-35° C. Finally, 24 g (0.12 mol of 9-ethylcarbazole, 98.5% strength, are added dropwise to the mixture in the course of 10 minutes. The mixture is heated to 70° C. and stirred at this temperature for 15 hours. The melt is cooled to 20°-25° C. and is then slowly introduced into 450 ml of methanol, with thorough stirring. The addition is regulated, with external cooling, so that a temperature of 50° C. is not exceeded. 90 g of di-isopropylnaphthalene and 100 ml of toluene are added in succession to the methanolic dyestuff solution. 373.2 g (2.8 mol) of 30% strength sodium hydroxide solution are then added dropwise so that the temperature is adjusted to about 40° C. The mixture is then stirred at 40° C. for 3 hours. Thereafter, 300 ml of water are added dropwise and the mixture is stirred for 30 minutes. The aqueous-methanolic phase which separates out at the bottom is removed.

Toluene and residual water are removed azeotropically under a waterpump vacuum of about 18-20 mbar and up to a temperature of 60° C. from the organic phase separated off. 157 g of a dark yellowish solution which, according to $E^1$ measurement in glacial acetic acid, contains 38% of colour-forming agent, are obtained in this manner. The $^1$H-NMR spectrum shows that the colour-forming agent consists of a mixture of about 90% of 1-methoxy-1-[9-ethyl-carbazol-3-yl]-[4-N-methyl-N-phenyl-amino-phenyl]-phenylmethane of the formula (1) and about 10% of carbinol base (formula 1 instead of OCH3/OH).

The solution can easily be diluted with further di-isopropylnaphthalene, chloroparaffin ($C_{12}$-$C_{18}$-n-paraffin with about 45% of chlorine), sesame oil or linseed oil to use concentrations in recording materials of 3%, 5% or 7%. Strong dark green colour shades are obtained on acid clay or bisphenol A.

EXAMPLE 3

A suspension of 15 g (0.05 mol) of phenyl 9-ethyl-carbazol-3-yl ketone and 9.0 g (0.05 mol) of 9-ethyl-carbazole, 98.5% strength, in 38.2g (0.25 mol) of phosphorus oxychloride is taken and 14.2 (0.1 mol) of phosphorus pentoxide are added in portions at room temperature. The reaction mixture is heated to 40° C. and stirred at this temperature for 20 hours. The melt is then cooled to room temperature and stirred into 170 ml of methanol. 143 g (1.07 mol) of 30% strength sodium hydroxide solution are slowly added dropwise at 40° C. The mixture is subsequently stirred at 40° C. for 2 hours, 100 ml of water are added and the mixture is cooled to 10°-15° C. Filtration, washing with water and drying in vacuo at 30° C. gives 24.5 g of a pale yellow crystalline powder of melting point 95°-98° C. The product consists of a mixture of predominantly carbinol base methyl ether and carbinol base of the formula

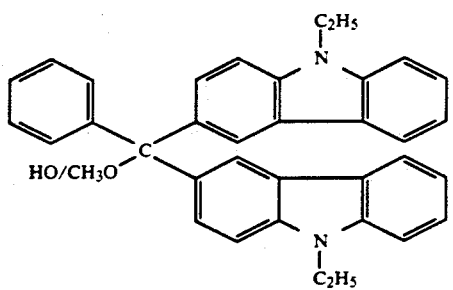

Recrystallization from isopropanol gives 18 g of almost colourless crystals of melting point: 115°-119° C. A solution in glacial acetic acid is blue-green with $\lambda_{max}=630$ nm and $\lambda_2=434$ nm.

EXAMPLE 4

14.4 g (0.05 mol) of 2-chloro-4'-N,N-diethylaminobenzophenone and 9.8 g (0.05 mol) of 9-ethylcarbazole are taken in 38.2 g (0.25 mol) of phosphorus oxychloride. 14.2 g (0.1 mol) of phosphorus pentoxide are slowly added at room temperature and the mixture is stirred at 70° C. for 24 hours. The melt is then poured onto 1,000 ml of ice-water and the mixture is stirred for 2 hours until the dyestuff separates out as crystals. After filtration, washing with water and drying in vacuo at 40° C., 12.3 g (89% of theory) of dark blue crystals of melting point: 57°-60° C. are obtained.

20 g (0.04 mol) of this dyestuff are dissolved in 80 ml of dimethylformamide. 21.6 g (0.12 mol) of 30% strength sodium ethylate solution are slowly added dropwise to the solution at room temperature. The mixture is subsequently stirred at 40° C. for 1 hour and filtered and the filtrate is poured onto 1,000 ml of ice-water. After addition of 50 g of sodium chloride, the precipitate which has separated out is filtered off with suction, washed with water and dried. Yield: 14.3 g (71.0% of theory) of pale yellow crystals of melting point: 105°-110° C. and of the formula:

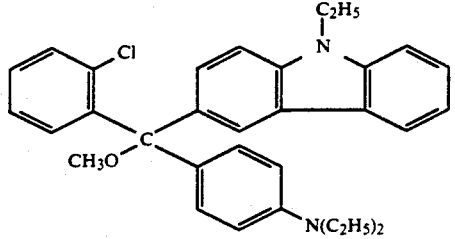

11.4 g of the moist press-cake of the carbinol base methyl ether of the formula (4) are dissolved with 32 g of di-isopropyl-naphthalene. After removal of the residual water in vacuo at 40°-50° C., a solution which contains about 20% of colour-forming agent is obtained.

A solution in acetic acid is blue with $\lambda_{max}=604$ nm. A strong blue colour with good fastness properties is developed on acid clay.

EXAMPLE 5

The following colour-forming agents are prepared analogously to Examples 1, 3 and 4.

TABLE 1

| Formula No. | a | b | Q | R | Color shade on acid clay or bisphenol A | λmax in glacial acetic acid |
|---|---|---|---|---|---|---|
| 4 | 4-C$_4$H$_9$ | 4-N(CH$_3$)-C$_6$H$_5$ | C$_6$H$_{13}$ | OCH$_3$/OH | green | 612 nm |
| 5 | 2-Cl | 4-N(CH$_3$)$_2$-C$_6$H$_5$ | C$_4$H$_9$ | OC$_2$H$_5$/OH | greenish-tinged blue | 605 nm |
| 6 | 4-Cl | 4-N(C$_2$H$_5$)-C$_6$H$_5$ | C$_2$H$_5$ | OH | green | 624 nm |

TABLE 1-continued

[Structure: diphenyl(carbazole)methane with substituents a, b on two phenyls, R on central carbon, Q on carbazole nitrogen]

| Formula No. | a | b | Q | R | Color shade on acid clay or bisphenol A | λmax in glacial acetic acid |
|---|---|---|---|---|---|---|
| 7 | 4-$C_4H_9$ | 4-N($C_4H_9$)$_2$ phenyl | $C_4H_9$ | $OC_2H_4OCH_3$ | dark green | 614 nm |
| 8 | 2-$C_4H_9$ | 4-N($CH_3$)(phenyl-3-) | $C_8H_{17}$ | $OC_4H_9$ | green | 628 nm |
| 9 | H | 4-$OCH_3$ | $C_4H_9$ | $OC_3H_7$-i | dull blue-violet | 578 nm |
| 10 | H | H | $C_2H_5$ | $OCH_3$/OH | orange | 494 nm |
| 11 | 4-$CH_3$ | 4-N($C_2H_5$)$_2$ 2-$OC_2H_5$ | $CH_3$ | $OC_2H_5$/OH | dark green | 623 nm |
| 12 | H | 4-N($C_2H_5$)(3-isobutyl-with gem-di$CH_3$) | $C_2H_5$ | $OCH_3$/OH | very dark blue-violet | 600 nm |
| 13 | 2-Cl | 4-N($C_8H_{12}$)(phenyl-3-) | $C_8H_{17}$ | $OCH_3$/OH | blue | 602 nm |
| 14 | 4-Cl | 4-N($CH_3$)phenyl | $C_2H_5$ | $OCH_3$/OH | green | 625 nm |
| 15 | H | 4-N($C_4H_9$)(3-C($CH_3$)$_3$-CH($CH_3$)-) | $C_2H_5$ | $OC_4H_9$ | dark blue-violet | 602 nm |
| 16 | H | 4-N($CH_3$)$_2$ 2-N($CH_3$)$_2$ | $C_8H_{17}$ | $OCH_3$/OH | deep dull blue-violet | 596 nm |
| 17 | 2-Cl | 4-$OCH_3$ 3-$OCH_3$ | $C_2H_5$ | $OCH_3$/OH | blue-violet | 583 nm |

EXAMPLE 6

5 g of the colour-forming agent of the formula of Example 1 are dissolved in a mixture of 60 g of dodecylbenzene and 40 g of chloroparaffin with a Cl content of 45%. 223 g of such a solution are mixed with 39.5 g of oxadiazinetrione of Desmodur H (NCO content 20.5%). The mixture is then mixed with 320 g of 0.5% strength polyvinyl alcohol solution and emulsified in the sheer gradient of a rotor/stator emulsifier apparatus. Crosslinking is carried out with 76 g of 9.0% strength diethylenetriamine solution. After-treatment is carried out by heating the dispersion to 60° C. and stirring it at 60° C. for three hours. A dispersion containing 40% of capsules of capsule size 7.3 μm is thereby obtained.

250 ml of this dispersion are taken and 40 g of finely ground cellulose (Arbocell BE 600/30 from Rettenmeier und Söhone) are sprinkled in, with intensive stirring. After intensive stirring for at least 30 minutes, 40 ml of 50% strength SBR latex (Baystal P 1600 from BAYER AG) are added. The resulting 48.5% strength coating colour is diluted with water to a solids content of 30% and brushed with an air brush onto the reverse side of a commercially available base paper. The amount applied is, after drying, 5 g/m².

The paper thus coated is placed with the coated side on that side of a commercially available carbon-free copy-through paper coated with developer substance. When writing pressure is exerted on the paper coated with capsules, a green copy which is stable to light results on the copy-through paper.

EXAMPLE 7

If 5 of a mixture of Example 2 is used and the procedure is analogous to Example 6, a paper coated with microcapsules which analogously gives a strong dark green copy which is very fast to light is obtained.

EXAMPLE 8

If 5 g of a mixture of Example 2 are used and the procedure is analogous to Example 6, a paper coated with microcapsules which analogously gives a green copy is obtained.

EXAMPLE 9

If 5 g of the colour-forming agent of Example 4 are used and the procedure is analogous to Example 6, a paper coated with microcapsules which analogously gives a blue copy is obtained.

EXAMPLE 10

If 5 g of the colour-forming agent of the formula

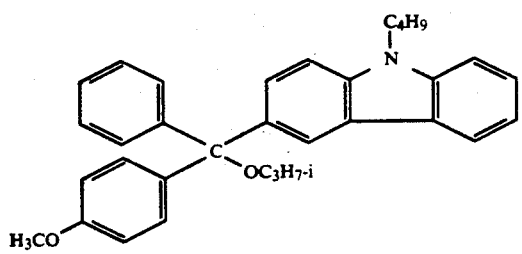

are used and the procedure is analogous to Examole 6, a paper coated with microcapsules which analogously gives a dull blue-violet copy which pales somewhat in light is obtained.

EXAMPLE 11

If 5 g of the colour-forming agent of the formula

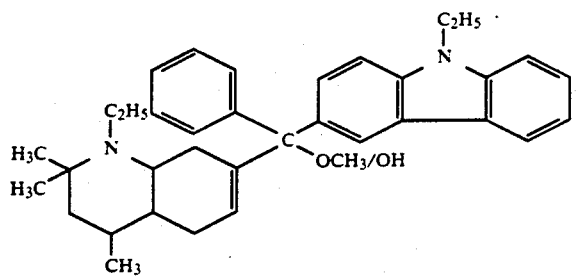

are used and the procedure is analogous to Example 6, a paper coated with microcapsules which analogously gives a dark blue-violet copy is obtained.

EXAMPLE 12

If 5 g of the colour-forming agent of the formula

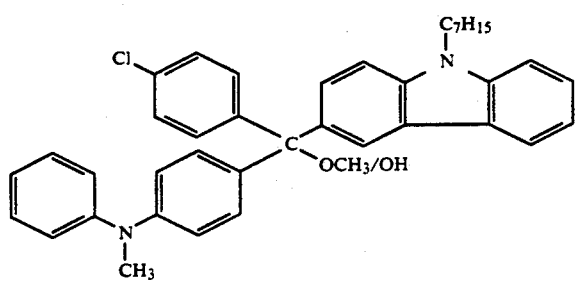

are used and the procedure is analogous to Example 6, a paper coated with microcapsules which analogously gives a green copy is obtained.

EXAMPLE 13

171 parts of an approximately 13% strength solution of a polyacrylic acid with an average molecular weight of less than 300,000 are brought to a pH of 4.5 with triethanolamine and to a total amount of 1,000 parts with water.

160 parts of a 90% strength melamine-formaldehyde resin (Luwipal 68 from BASF, Ludwigshafen) are added to this solution.

1,300 parts of a solution of 5% of colour toner of Example 2 in diisopropylnaphthalene (KMC 113 from Rütgers Kureha Solvent, Duisburg are then added and an emulsion is prepared with a mixing siren at a high speed of rotation.

The emulsion is then diluted with 700 parts of water, heated to 60° C., with stirring, and reacted completely at 60° for 6 hours. After the dispersion has been cooled, it is neutralized with triethanolamine.

A 40% strength microcapsule dispersion of average capsule size 5 μm is obtained.

EXAMPLE 14

32 g of 4,4'-isopropylidene-diphenol, 3.8 g of the distearylamide of ethylenediamine, 89 g of kaolin, 20 g of a polyvinyl alcohol hydrolyzed to the extent of 88% and 55 ml of water are ground in a bead mill until the particle size is about 5 μm. 6 g of the compound of Example 4, 3 g of a polyvinyl alcohol hydrolyzed to the extent of 88% and 60 ml of water are ground in a second bead mill to a particle size of about 3 μm. The two dispersions are brought together and brushed onto paper with a dry application weight of 5.5 g/m². An intense blue colour which has good fastness to light and sublimination is obtained when the paper is touched with a heated ball-point pen.

EXAMPLE 15

40 g of a finely powdered polyacrylonitrile polymer prepared from 94% of acrylonitrile, 0.5% of methallylsulphonic acid and 5.5% of methyl arylate are ground with 225 g of an 8% strength aqueous polyvinyl alcohol solution with the addition of 1.3 g of distearyl phosphate in a bead mill in accordance with DE-OS (German Published Specification) 3,337,296. A second dispersion is prepared from 1 g of the compound of Example 1 and 55 g of an 8% strength aqueous polyvinyl alcohol solution. The dispersion of the colour-forming agent is mixed with that of the acceptor in a ratio of 1/10 and the mixture is applied to cellulose paper by means of a doctor blade and dried so that an application weight of 6 to 7 g/m² is obtained. The paper can be written on with writing means, such as, for example, a ball-point pen. It is insensitive to high pressure. When the paper is touched with a heated pen, clear, sharp green writing with no shadows is obtained. The lightfastness of the dyeing is excellent.

We claim:

1. Colour-forming agents of the general formula

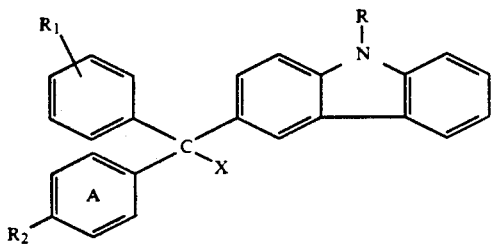

wherein
X denotes hydroxyl, alkoxy, alkenyloxy, aralkoxy, cycloalkoxy, aryloxy, acyloxy, alkylamino, dialkylamino, acylamino, aralkylamino or arylamino,
R denotes alkyl, alkenyl or aralkyl,
$R_1$ denotes hydrogen, halogen or alkyl,
$R_2$ denotes alkoxy, aralkoxy, aryloxy or a radical of the formula

$Y_1$ and $Y_2$ independently of one another denote alkyl, aryl, cycloalkyl or aralkyl or $R_2$, with A in the o-position, forms a heterocyclic ring,
optionally a benzene ring can be fused onto the ring A, in the o-/m-position relative to $R_2$, and the ring A and its fused-on rings and the cyclic and acyclic radicals can carry further non-ionic substituents.

2. Colour-forming agents according to claim 1 of the general formula

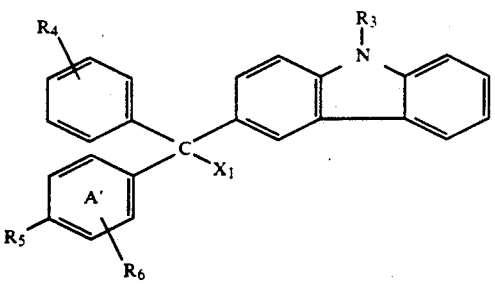

$X_1$ denotes hydroxy, $C_1$-$C_{12}$-alkoxy, $C_1$-$C_4$-alkoxy-substituted
$C_1$-$C_{12}$-alkoxy or benzyloxy,
$R_3$ denotes $C_1$-$C_{12}$-alkyl or benzyl,
$R_4$ denotes hydrogen, chlorine or $C_1$-$C_{12}$-alkyl,
$R_5$ denotes $C_1$-$C_{12}$-alkoxy, benzyloxy, phenoxy or a radical of the formula

$R_6$ denotes hydrogen, chlorine, $C_1$-$C_{12}$-alkyl, $C_1$-$C_{12}$-alkoxy, $C_1$-$C_4$-alkylamino or di-$C_1$-$C_{12}$-alkylamino
$Y_3$ and $Y_4$ independently of one another denote $C_1$-$C_{12}$-alkyl which is optionally substituted by chlorine, cyano, $C_1$-$C_4$-alkoxycarbonyl or $C_1$-$C_4$-alkoxy, or cyclohexyl, phenyl or benzyl, which can be substituted by chlorine, $C_1$-$C_4$-alkyl or $C_1$-$C_4$-alkoxy, or
$R_5$ and $R_6$ denote members which, together with ring A', are required to complete a ring system of the following formulae

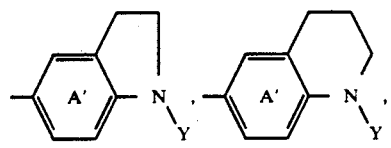

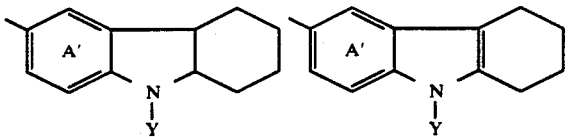

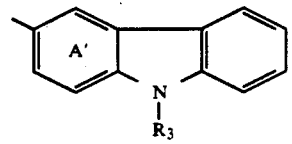

wherein
Y stands for $C_1$-$C_{12}$-alkyl, Cl-$C_2$-$C_4$-alkyl, $C_1$-$C_4$-alkoxy-C;hd 2-$C_2$-$C_4$-alkyl, phenyl or benzyl and the saturated ring component can carry up to 4 radicals from the group comprising chlorine, methyl, ethyl, methoxy, ethoxy and phenyl.

3. Colour-forming agents according to claim 1 of the general formula

[Structure: triarylmethane with carbazole group, substituents $R_8$, $R_7$, $R_9$, $R_{10}$, $X_2$]

wherein
$X_2$ denotes hydroxyl or $C_1$–$C_{12}$-alkoxy,
$R_7$ denotes $C_1$–$C_{12}$-alkyl,
$R_8$ denotes hydrogen, chlorine or $C_1$–$C_{12}$-alkyl,
$R_9$ denotes $C_1$–$C_4$-alkoxy, benzyloxy or a radical of the formula $$-N\begin{matrix}Y_5\\Y_6\end{matrix}$$

$R_{10}$ denotes hydrogen, methyl, ethyl, propyl, butyl, methoxy, ethoxy, dimethylamino or diethylamino or
$R_9$ and $R_{10}$ denote members which, together with the benzene ring to which they are bonded, are required to complete a ring system of the formulae

[Two fused ring structures with N-Y' substituents, containing $CH_3$ groups]

or

[Carbazole structure with N-Y' substituent]

Y' denotes $C_1$–$C_{12}$-alkyl and
$Y_5$ and $Y_6$ independently of one another denote $C_1$–$C_{12}$-alkyl, phenyl or benzyl.

4. Concentrated solutions of colour-forming agents of claim 1 in water-soluble organic solvents from the group comprising optionally chlorinated hydrocarbons and phthalic acid esters.

5. Process for the preparation of colour-forming agents of claim 1, characterized in that ketones of the formula

[Structure: $R_1$-phenyl-CO-phenyl(A)-$R_2$]

are subjected to a condensation reaction with amines of the formula

[Diphenylamine structure with R substituent on N]

or ketones of the formula

[Structure: $R_1$-phenyl-CO-phenyl-N(R)-phenyl]

are subjected to a condensation reaction with amines of the formula

[Structure: $R_2$-phenyl with A substituent]

in the presence of a condensing agent which supplies an anion $An^-$, to give the colour salts of the formula

[Cationic structure: triarylmethyl cation with $R_1$, $R_2$, A, R, carbazole groups and $An^\ominus$ counterion]

wherein
A, R, $R_1$ and $R_2$ have the abovementioned meaning and
$An^-$ denotes an anion from the series comprising Cl, Br, acetate, sulphate and phosphate,
and these salts are reacted without intermediate isolation with bases of the formula Me X wherein
X has the abovementioned meaning and
Me denotes an alkali metal or alkaline earth metal ion,
in an organic reaction medium; a water-insoluble solvent is added and optionally after addition of water, the layers formed are separated.

6. Process according to claim 5, wherein the reactions are carried out in the presence of low-boiling and high-boiling water-insoluble solvents, and after addition of water the organic phase containing the colour-forming agent is separated off and the low-boiling solvent is removed therefrom.

7. A thermoreactive paper containing a colour-forming agent according to claim 1.

8. A pressure-sensitive recording material containing a colour-forming agent according to claim 1.

9. A pressure-sensitive recording material containing a solution according to claim 4.

* * * * *

UNITED STATES PATENT AND TRADEMARK OFFICE
CERTIFICATE OF CORRECTION

PATENT NO. : 5,094,688

DATED : March 10, 1992

INVENTOR(S) : Eckstein et al.

It is certified that error appears in the above-identified patent and that said Letters Patent is hereby corrected as shown below:

Title Page      U.S. PATENT DOCUMENTS: After " 4,211,436, 7/1980 " delete " Kuhlthou " and substitute -- Kuhlthau --; after " 4,275,005, 6/1981 " delete " Petitpiette " and substitute -- Petitpierre --; after " 4,362,565, 12/1982 " delete " Pineaer " and substitute -- Pineger --

Col. 16, line 13    Above " $X_1$ " insert -- wherein --

Col. 16, line 63    Delete " C;hd 2- "

Signed and Sealed this

Twenty-third Day of November, 1993

Attest:

BRUCE LEHMAN

*Attesting Officer*     *Commissioner of Patents and Trademarks*